Patented Aug. 15, 1950

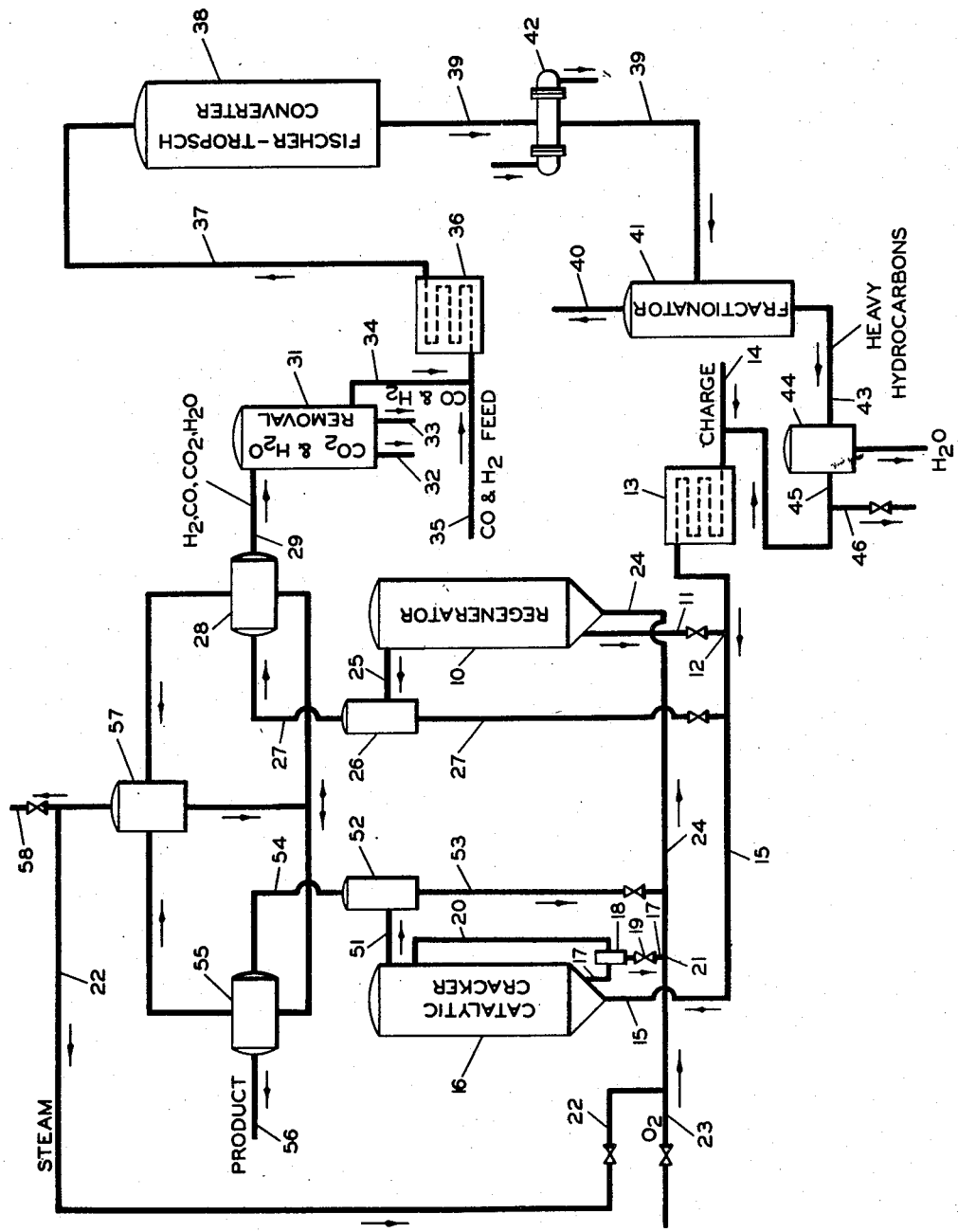

2,518,775

UNITED STATES PATENT OFFICE 2,518,775

COMBINED HYDROCARBON CONVERSION-HYDROCARBON SYNTHESIS PROCESS

Jesse A. Guyer, Bartlesville, Okla., assignor to Phillips Petroleum Company, a corporation of Delaware Application August 29, 1947, Serial No. 771,332

3 Claims. (Cl. 260—449.6)

This invention relates to hydrocarbon conversion processes, such as cracking, dehydrogenation, and reforming which deposit carbon and to the production of a suitable Fischer-Tropsch synthesis gas by contacting the deposited carbon with a mixture of steam and oxygen. A specific modification of the invention pertains to a process for the simultaneous catalytic conversion of hydrocarbons and the synthesis of hydrocarbons from a synthesis gas prepared in the regeneration of the catalyst utilized in the conversion.

Hydrocarbon conversion processes such as cracking, reforming, and dehydrogenation result in deposition of carbonaceous matter in the reaction zone on the contact mass and/or on the apparatus itself which requires the removal thereof at frequent intervals. It is conventional to remove the carbonaceous deposit by combustion with air or air-containing mixtures and venting to atmosphere the effluent from the combustion or regeneration zone thereby wasting potentially valuable raw materials comprising C and H. A primary object of the invention is to control the regeneration step required concomitantly with hydrocarbon conversion so as to obtain an effluent abundant in CO and $H_2$ suitable for hydrocarbon synthesis.

The synthesis of hydrocarbons boiling in the gasoline range produces gasoline of relatively low octane number as compared to hydrocarbons from a cracking process and it is usually necessary to subject the synthesized hydrocarbons to further treatment to improve their utility as motor fuel. It is an object of the present invention to provide a process which eliminates the necessity of further treatment of synthetic hydrocarbons to prepare them for desirable motor fuel.

It is also an object of the invention to provide a combined hydrocarbon conversion and synthesis process which produces a suitable motor fuel and utilizes normally waste gases from the regeneration step required in the conversion phase of the process.

A further object of the invention is to provide a hydrocarbon conversion process which produces a by product gas suitable for a Fischer-Tropsch synthesis gas. Other objects of the invention will become apparent from the accompanying disclosure.

The invention encompasses contacting a suitable hydrocarbon stream with a catalyst in a conversion zone under conversion conditions, with concomitant deposition of carbon on the catalyst, simultaneously contacting carbon-contaminated used catalyst with a mixture of steam and oxygen in a regeneration zone maintained under conditions favorable to the reaction of steam with carbon, to form predominantly carbon monoxide and hydrogen by the "water gas" reaction, and passing the resulting regeneration effluent as a feed to a Fischer-Tropsch synthesis. Since CO and $H_2$ are the essential constituents in synthesis gas it is desirable to convert as much carbon as possible to CO and to inhibit the production of $CO_2$. It is found that high temperatures and the presence of substantial amounts of steam in the regeneration gas favor the production of CO and $H_2$ in the regeneration zone. It is, therefore, desirable to operate at the highest temperature permissible without deleterious effect to the catalyst of the conversion process. Generally it is preferred to operate in the range of about 1100° to about 1800° F. and with a regeneration gas containing from about 10% to about 80% oxygen by volume and from about 90% to about 20% steam. This amounts to a steam to oxygen ratio between 9:1 and 1:4 by volume. Conventional cracking catalysts may be used including bauxite, highly acid treated clays, synthetic gel type composites comprising silica-alumina, etc.

While the application of the invention is not limited to cracking processes, nor more specifically to catalytic cracking, it has particular application to this type process and, especially, to the so called "fluidized" catalyst process; and, because the subsequent disclosure is directed largely to this application of the invention, it is not to be construed as so limited. When cracking in the presence of a fixed-bed catalyst, it is conventional to maintain a series of beds onstream while regenerating another series of beds which were previously deactivated on-stream. In this way, at least one series of battery of cracking chambers is always on regeneration making it feasible to continuously supply synthesis gas to a Fischer-Tropsch converter. It is also feasible to utilize the carbon deposition in any non-catalytic hydrocarbon conversion process in preparing a synthesis gas by the process of the invention.

The process of the invention has advantageous application to conventional fluid catalyst cracking processes which utilize an aerated, finely divided, solid catalyst. In this type of process catalyst is continuously passed into a cracking chamber suspended in the vaporized oil to be cracked, is continuously removed from the cracking chamber, and is continuously passed to a regeneration chamber in suspension in air or an air-flue gas mixture where carbon is burned off the catalyst preparatory to returning it to the cracking chamber in a suspension of oil vapors to repeat the cycle. Heat for the exothermic cracking reaction is supplied by the hot catalyst from the regeneration zone, as well as part of the heat for flash vaporizing the oil to be cracked.

The fluid catalyst process, similar to other catalytic cracking processes is operated at a cracking temperature within the range of about 900° to about 1100° F. and under the usual range of conditions permissible in hydrocarbon cracking. Suitable charge stock includes oils having an API gravity of between about 20° and 40° and gasoline stock of between about 40° and 65° API gravity. Conversion usually varies between about 30 and about 80 per cent. Catalyst to oil ratios between about 3:1 and about 15:1 by weight are conventional while pressures generally range from about atmospheric to about 25 P. S. I. G.

In a fluid cracking process such as described herein, carbon lay-down on the catalyst will vary with operating conditions from about 1 to about 10 per cent by weight of catalyst and it is necessary to remove this carbon before reusing the catalyst. Conventionally, the finely divided catalyst is removed from the cracking chamber and fluidized with a regeneration gas containing sufficient oxygen to burn off deposited carbon and this aerated mixture is passed into a suitable regeneration chamber for this step in the process. The regeneration (combustion) not only removes carbon from the catalyst but also raises its temperature so as to transfer sufficient heat to the oil in the cracking step to furnish the heat requirements of the process. Regeneration effluent, containing largely $CO_2$ with lesser amounts of CO, is generally vented to atmosphere after extracting sensible heat therefrom.

It is found that the conventional regeneration step can be modified to produce an effluent stream suitable for Fischer-Tropsch synthesis gas so as to make use of the carbon lay-down in hydrocarbon conversion. By properly selecting the regeneration gas constituents and regulating the proportions of the same, as well as the temperature of the regeneration, a regeneration effluent may be produced which contains at least as much CO as $CO_2$ with adequate amounts of hydrogen for synthesis gas. Higher temperatures in the range of about 1100° to 1800° F. generally result in larger concentrations of CO and $H_2$. Likewise, the presence of a substantial proportion of steam in the regeneration gas is conductive to increased CO and $H_2$ formation, probably due to the water gas reaction. Optimum temperature and steam-oxygen ratio are interdependent and are also dependent upon the particular type of catalyst being regenerated. In general, synthetic clay type catalysts do not require as high temperatures to produce a given CO to $CO_2$ ratio as other types of catalysts.

Another important advantage gained in using regeneration gas mixtures consisting of steam and oxygen as compared with air or air-flue gas mixtures is the avoidance of removing large quantities of nitrogen from the regeneration effluent before passing it to the synthesis reactor.

It is desirable to purify the effluent stream to concentrate the CO and $H_2$ therein by removing water, $CO_2$, etc., by any of the conventional methods available therefor, such as condensation, scrubbing, etc. It may also be desirable to adjust the CO-$H_2$ mole ratio to that usually found in a Fischer-Tropsch feed, such as about 1:2, or at least in the range of from about 1:3 to about 2:3. A particularly advantageous procedure is to admix the purified effluent with a feed stream to a Fischer-Tropsch reaction, which feed stream is regulated to compensate for any deficiency in ratio requirements in the effluent. Mixtures of steam, carbon dioxide, and light hydrocarbons are conventionally converted to synthesis gas by contact with a catalyst such as supported nickel at about 1500° F. The effluent from such a reaction may be controlled as to CO and $H_2$ ratio and supplemented with regeneration gas effluent according to the invention. Another procedure is simply to supplement the deficient constituent of the effluent. In situations where a battery of cracking units and regenerators are in operation, the effluents of the series of regenerators may be combined, with suitable adjustment of the CO-$H_2$ ratio, to provide a feed to a synthesis reaction.

In performing the invention, conventional procedures in Fischer-Tropsch synthesis are applicable. Reaction temperatures may vary from about 340° to about 700° F., depending upon the type of catalyst and other reaction conditions. Conventional catalysts include metals such as cobalt, nickel, iron, and manganese and their oxides, with or without a promotor such as thorium oxide. Pressures may be varied from about atmospheric to 20 atmospheres. With an iron catalyst average space velocity is about 100 volumes (STP) per volume of catalyst per hour. The reaction can be controlled to effect substantially complete conversion of CO with substantial yields of hydrocarbons boiling in the gasoline range.

The synthesis effluent comprising a wide range of hydrocarbons, but predominating in normally liquid hydrocarbons, is fractionated to separate a fraction of $C_4$ and lighter hydrocarbons, a suitable gasoline fraction, and a heavy fraction. The light fraction may be passed to the synthesis gas producer, referred to hereinbefore, to be converted to CO and $H_2$. The heavy fraction containing the hydrocarbons boiling above the gasoline range is desirably passed to the cracking step to be cracked to suitable gasoline stock along with the regular charge to the cracking unit.

The gasoline fraction from the synthesis effluent may be blended with a gasoline fraction separated from the cracking effluent to produce a gasoline of suitable octane number for motor fuel. Taken alone, the synthesized gasoline generally has a relatively low octane number for motor fuel and must either be further processed by reforming, isomerization, etc., or blended with other hydrocarbons of superior antiknock characteristics to produce a blend of sufficient octane number for a suitable motor fuel. The combined process of the invention offers a means of utilizing the synthetic gasoline as a motor fuel without further treatment, other than blending.

For a more complete understanding of this invention, reference may be had to the accompanying drawing which shows diagrammatically, one arrangement of apparatus for carrying out the process of the invention.

Referring now to the drawing, hot catalyst from regenerator 10 at a temperature in the range of about 1000° to 1500° F. passes into standpipe 11, down which it flows to oil injection point 12 where it flash vaporizes the fresh oil charge preheated in heater 13 to a temperature sufficient to balance the total heat requirements of the reaction. Any suitable oil cracking stock is charged to furnace 13 via line 14 and, as it is mixed with hot catalyst at point 12, is flash vaporized and forms a suspended fluidized catalyst-hydrocarbon mixture which is forced through line 15 into catalytic cracker 16 by the pressure maintained in the regenerator plus the force of gravity exerted on the dense catalyst in regenerator 10 and regenerator standpipe 11. In reactor 16, the catalyst settles to a definite level and forms a fluidized bed the depth of which regulates the time of reaction and can be varied to provide the desired degree of cracking. This bed is maintained in a fluid turbulent condition by the entering feed vapors which continually pass upward, thereby effecting intimate contact of oil with catalyst and producing a substantially uniform temperature in the range of about 900 to 1100° F. through the bed. As cracking progresses, coke forms on the catalyst and reduces its effectiveness or activity. The spent catalyst laden with coke is continuously and automatically withdrawn through line 17 to spent catalyst stripper 18 where the adsorbed and entrained vapors are dissociated from the catalyst and carried by countercurrent stripping medium back into the top of the reactor vapor space via line 20. Spent catalyst separates from the oil vapors by gravity and drops through an automatically controlled valve 19 to regeneration gas injection point 21 where a suitable mixture of steam from line 22 and oxygen from line 23 "fluffs up" the catalyst causing it to flow as a fluid through regenerator return line 24 to regenerator 10. The actual movement or flow of the catalyst is effected without direct mechanical aid, the pressure head in the reactor 16 plus the hydrostatic pressure in line 17 being sufficient to force the spent catalyst-regenerator gas mixture up regenerator return line 24 into regenerator 10 where the catalyst again settles to form a bed and where, as in the reactor, the continuous influx of the aerated catalyst creates a zone of extreme turbulence and uniform temperature. The oxygen-steam mixture utilized to carry the spent catalyst into the regenerator continuously regenerates the catalyst by oxidation of the carbon and also by converting a substantial portion of the carbon to CO by the water gas reaction. These reactions are controlled so as to bring the temperature of the catalyst up to a desirable point within the range of about 1000 to about 1800° F. for effecting the desired regeneration and formation of synthesis gas and for adjusting the temperature of the catalyst as a heat transfer medium for vaporizing the oil feed and supplying the heat necessary for the cracking reaction. The reactivated hot catalyst is retained in the lower part of the regenerator and in standpipe 11 from which it is constantly withdrawn into line 15 at oil vaporization point 12 for reuse as needed. The effluent from regenerator 10, comprising hydrogen and carbon monoxide together with water and carbon dioxide, is withdrawn through line 25 into cyclone separator 26 where entrained catalyst is separated from the vapors and returned via line 27 to line 15 for reuse in the process. The effluent vapors freed from suspended catalyst pass via line 27 through waste heat boiler 28 and line 29 to conventional separation means 31 in which $CO_2$ and $H_2O$ are largely removed and discharged through lines 32 and 33. The effluent stream from separation means 31 containing essentially CO and $H_2$ passes through line 34 into line 35 which carries a suitable CO-$H_2$ feed into heater or furnace 36 serving to regulate the temperature of the combined feed within Fischer-Tropsch synthesis range of about 340 to about 700° F. The preheated CO-$H_2$ feed passes into Fischer-Tropsch conversion chamber 38 through line 37 where suitable conditions are maintained for the conversion of a substantial portion of the feed to hydrocarbons boiling in the gasoline range.

A Fischer-Tropsch synthesis catalyst comprising metal such as cobalt, nickel, iron, manganese, or oxides thereof, with or without a promotor such as thorium oxide, is utilized in converter 38. The effluent from the Fischer-Tropsch synthesis passes through line 39 to fractionator 41 passing through heat exchanger 42 which controls the temperature of the stream going into the fractionator. Two or more hydrocarbon fractions are withdrawn from fractionator 41. A lighter fraction containing essentially hydrocarbons boiling in the gasoline range is withdrawn through line 40 from which it is passed to further treating means to produce a stream suitable for blending with the cracked product from the catalytic cracking process. The heavier fraction made up essentially of hydrocarbons boiling above about 400° F. and containing any entrained water are passed through line 43 into a suitable separation means 44 which removes the water from the hydrocarbons. The heavier water-free hydrocarbon fraction is passed through line 45 to line 14 where it is mixed with the charge to the catalytic conversion process. This fraction or any portion thereof may also be removed through line 46 for other treatment or use.

Returning to the catalytic cracking process, the cracked effluent containing entrained catalyst particles passes through line 51 to cyclone separator 52 which removes the entrained catalyst from the vaporous effluent and returns the same through line 53 to line 24 where it joins the stream of catalyst being returned to the regeneration zone. The cracked product passes through line 54 to waste heat boiler 55 from which it is removed through line 56 for fractionation to separate a suitable fraction for blending with the Fischer-Tropsch synthesis fraction, or portion thereof, removed from line 40 as a product of the synthesis.

Sufficient steam is generated in waste heat boilers 55 and 28 and collected in tank 57 to supply the steam requirements of the regeneration step. Excess steam may be withdrawn through line 58.

The following examples are illustrative of certain advantages of one feature of the invention:

EXAMPLE I

A carbon-fouled catalyst sample is regenerated by contact with air (no steam present) at a temperature of substantially 1200° F. producing an effluent of the composition shown under column A in the table below. The ratio of $CO_2$ to CO in volume per cent is 64:36.

EXAMPLE II

A portion of the fouled catalyst sample of Example I is regenerated under substantially identical conditions to those of Example I, except that a mixture of steam and oxygen is used as the regeneration gas. The effluent has the composition shown in the table under column B. The ratio of $CO_2$ to CO in volume per cent is 56:44.

Table

|    | A | B |
|----|------|------|
| $CO_2$ | 14.0 | 37.5 |
| $CO$ | 8.0 | 29.9 |
| $O_2$ | 2.0 | ---- |
| $H_2$ | trace | 32.6 |
| $N_2$ | 76.0 | ---- |
| Total | 100.0 | 100.0 |

Analysis on dry basis.

By comparison of the results in the examples it is obvious that the effluent in Example II is superior to that of Example I for a hydrocarbon synthesis feed. The ratio of $CO_2$ to $CO$ is considerably less, it contains a large proportion of $H_2$, and is free from nitrogen.

From the foregoing it can be seen that the invention provides a combined process for simultaneous, continuous conversion and synthesis of hydrocarbons which utilizes the carbonaceous catalyst deposit of the conversion step as a source of raw material for the feed to the synthesis step, thereby producing valuable hydrocarbons in both the conversion and synthesis steps for use as separate products or for blending into a motor fuel.

The invention has wide application and is not limited to specific reaction conditions other than those described as such. Various modifications of the invention are permissible without departing from the spirit and scope thereof.

I claim:

1. A process for producing normally liquid hydrocarbons boiling in the gasoline range comprising cracking a suitable hydrocarbon feed at a temperature in the range of 900 to 1100° F. and a pressure between 1 and 25 atmospheres absolute in contact with a cracking catalyst so as to produce hydrocarbons boiling in the gasoline range with concomitant deposition of carbon on said catalyst in an amount in the range of 1 to 10 per cent by weight thereof; converting said carbon to CO by contacting same at a temperature in the range of 1100 to 1800° F. and a pressure up to 25 atmospheres absolute with a gaseous mixture consisting essentially of steam and oxygen in a ratio in the range of 9:1 to 1:4 by volume with concomitant production of $H_2$ and a minimum amount of $CO_2$; concentrating the CO and $H_2$ in the regeneration effluent by removal of $CO_2$ and $H_2O$ therefrom and contacting the resulting mixture of CO and $H_2$ with a Fischer-Tropsch catalyst at a temperature in the range of 340 to 700° F. and at a pressure in the range of 1 to 20 atmospheres absolute so as to synthesize hydrocarbons boiling in the gasoline range together with heavier hydrocarbons; separating the synthesis effluent into a gasoline fraction and a heavier fraction; recycling the heavier fraction to the cracking step; and blending gasoline hydrocarbons from the synthesis and cracking steps.

2. A process for producing motor fuel which comprises cracking a suitable hydrocarbon cracking stock at a temperature in the range of 900 to 1100° F. in a cracking zone in contact with a fluidized particle form solid cracking catalyst with concomitant deposition of carbonaceous material thereon in an amount in the range of 1 to 10 weight per cent of said catalyst; transferring resulting fouled catalyst from said cracking zone to a catalyst regeneration zone and there contacting same with a gaseous mixture consisting essentially of steam and oxygen in a ratio in that order in the range of 9:1 to 1:4 by volume under conditions, including a temperature in the range of 1100 to 1800° F. and a pressure up to 25 atmospheres absolute, which effect removal of coke from said catalyst with concomitant formation of substantial amounts of CO and $H_2$ and a minimum of $CO_2$; removing $CO_2$ and $H_2O$ from the regeneration effluent and passing the resulting mixture of CO and $H_2$ in contact with a Fischer-Tropsch catalyst in a synthesis zone maintained under synthesis conditions, including a temperature in the range of 340 to 700° F. and a pressure in the range of 1 to 20 atmospheres absolute, so as to effect synthesis of hydrocarbons boiling in the gasoline range together with higher boiling hydrocarbons; fractionating an effluent from said synthesis zone into a gasoline fraction and a heavier fraction and passing the heavier fraction to said cracking zone; recovering a gasoline fraction from said cracking zone and blending same with the gasoline fraction from said synthesis zone.

3. A process for producing motor fuel which comprises contacting a suitable hydrocarbon cracking stock at a temperature in the range of 900 to 1100° F. and at a pressure between 1 and 25 atmospheres absolute in a cracking zone in contact with a fluidized particle form solid cracking catalyst so as to produce an effluent containing substantial amounts of hydrocarbons boiling in the gasoline range with concomitant deposition of carbonaceous material on said catalyst in an amount in the range of 1 to 10 per cent by weight thereof, the ratio of catalyst to hydrocarbon being maintained in the range of 3:1 to 15:1 by weight; transferring resulting coked catalyst to a catalyst regeneration zone and there contacting the same with a gaseous mixture of steam and oxygen in a ratio in the range of 9:1 to 1:4 by volume under conditions which effect removal of coke from said catalyst, including a temperature in the range of 1100 to 1800° F. and a pressure up to 25 atmospheres absolute, with concomitant production of an effluent containing substantial amounts of CO and $H_2$ and a minimum amount of $CO_2$; concentrating the CO and $H_2$ in said effluent by removal of $H_2O$ and $CO_2$ and adjusting the ratio of the same to the range of 1:3 to 2:3, reacting the resulting CO-$H_2$ mixture in a Fischer-Tropsch synthesis zone in contact with a synthesis catalyst at a temperature in the range of 340 to 700° F., at a pressure between 1 and 20 atmospheres absolute, and for a time regulated so as to effect the synthesis of hydrocarbons boiling in the gasoline range together with other hydrocarbons; and blending a gasoline fraction from the synthesis zone with a gasoline fraction from the cracking zone.

JESSE A. GUYER.

REFERENCES CITED

The following references are of record in the file of this patent:

UNITED STATES PATENTS

| Number | Name | Date |
|---|---|---|
| 2,248,196 | Plummer | July 8, 1941 |
| 2,264,427 | Asbury | Dec. 2, 1941 |
| 2,284,603 | Belchetz et al. | May 26, 1942 |
| 2,344,900 | Reeves et al. | Mar. 21, 1944 |
| 2,380,391 | Bates | July 31, 1945 |
| 2,400,075 | Claussen | May 14, 1946 |
| 2,411,592 | Reeves | Nov. 26, 1946 |
| 2,445,328 | Keith | July 20, 1948 |